(12) United States Patent
Motoyui

(10) Patent No.: US 7,616,458 B2
(45) Date of Patent: Nov. 10, 2009

(54) PWM CURRENT CONTROLLING APPARATUSES CAPABLE OF OPTIMALLY CORRECTING LOAD CURRENT

(75) Inventor: Toshiaki Motoyui, Shiga (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 35 days.

(21) Appl. No.: 11/714,903

(22) Filed: Mar. 7, 2007

(65) Prior Publication Data

US 2007/0210783 A1 Sep. 13, 2007

(30) Foreign Application Priority Data

Mar. 8, 2006 (JP) ............... 2006-062233

(51) Int. Cl.
*H02M 3/335* (2006.01)
(52) U.S. Cl. ............... 363/21.1; 363/21.01; 363/21.05; 363/21.13
(58) Field of Classification Search ............ 363/17, 363/19, 21.05, 21.09, 21.1; 323/277, 281, 323/283, 314, 317
See application file for complete search history.

(56) References Cited

U.S. PATENT DOCUMENTS

| | | | |
|---|---|---|---|
| 4,688,162 A * | 8/1987 | Mutoh et al. ............... 363/80 |
| 5,965,038 A * | 10/1999 | Nomura et al. ............ 219/110 |
| 6,603,671 B2 * | 8/2003 | Tokunaga et al. ............ 363/17 |
| 6,700,365 B2 * | 3/2004 | Isham et al. ................ 323/317 |
| 7,042,203 B2 * | 5/2006 | Van Der Horn et al. ..... 323/285 |
| 7,061,215 B2 * | 6/2006 | Harris ......................... 323/268 |
| 7,116,563 B2 * | 10/2006 | Hua ......................... 363/21.06 |
| 2001/0033504 A1 * | 10/2001 | Galbiati et al. ................ 363/98 |
| 2002/0136030 A1 * | 9/2002 | Tokunaga et al. ............. 363/17 |
| 2003/0107358 A1 * | 6/2003 | Isham et al. ................ 323/283 |

FOREIGN PATENT DOCUMENTS

| | | | |
|---|---|---|---|
| EP | 693749 A1 * | 1/1996 |
| JP | 5-137255 | 6/1993 |
| JP | 5-307702 | 11/1993 |
| JP | 5-328070 | 12/1993 |

* cited by examiner

*Primary Examiner*—Edward Tso
*Assistant Examiner*—M'Baye Diao
(74) *Attorney, Agent, or Firm*—McGinn IP Law Group, PLLC

(57) ABSTRACT

In a current controlling apparatus for controlling a load current flowing through a load, a reference level generating circuit generates a reference level signal, and a reference signal generating circuit generates a reference signal in accordance with the reference level signal. A bridge circuit includes a plurality of semiconductor elements so that the semiconductor elements are turned ON and OFF to supply the load current to the load. A sensing circuit senses the load current, to thereby generate a sense signal in accordance with the load current. A current correction circuit including a correction comparator compares the sense signal with the reference level signal to generate a correction signal, so that the reference signal is corrected by the correction signal.

16 Claims, 11 Drawing Sheets

US 7,616,458 B2

PWM CURRENT CONTROLLING APPARATUSES CAPABLE OF OPTIMALLY CORRECTING LOAD CURRENT

BACKGROUND OF THE INVENTION

1. Field of the Invention

The present invention relates to a pulse width modulation (PWM) current controlling apparatus for controlling PWM currents flowing through a load.

2. Description of the Related Art

Current controlling apparatuses have been known to compare a load current flowing through a load with an aimed current, so that the load current is brought close to the aimed current (see: JP-5-137255A, JP-5-307702A and JP-5-328070A).

A first PWM current controlling apparatus is constructed by a reference digital-to-analog converter for performing a digital-to-analog conversion upon digital data to generate a reference level signal, a triangular-wave signal generating circuit for generating a triangular-wave signal in accordance with a PWM timing signal, a sensing circuit for sensing a load current flowing through a load such as a motor to generate a sense signal in accordance with the load current, an adder for adding the triangular-wave signal to the reference level signal, to thereby generate a reference signal, a comparator for comparing the sense signal with the reference signal, to thereby generate a PWM signal, a predriver for generating a plurality of PWM current controlling signals in accordance with the PWM signal, and a bridge circuit including semiconductor elements connected to the load. In this case, the semiconductor elements are driven by the PWM current controlling signals. This will be explained later in detail.

In the above-described first prior art PWM current controlling apparatus, however, it is impossible to make the load current coincide with an aimed current under any load condition over a wide load current range.

In order to make the load current coincide with an aimed currents in a second prior art PWM current controlling apparatus, the reference level signal is also directly supplied to the comparator as well as the reference signal, so that the reference signal is substantially corrected by the reference level signal. This also will be explained later in detail.

SUMMARY OF THE INVENTION

In the above-described prior art PWM current controlling apparatus, however, the deviation of the load current from an aimed current is suppressed only under a special load condition over a small load current range.

According to the present invention, in a current controlling apparatus for controlling a load current flowing through a load, a reference level generating circuit generates a reference level signal, and a reference signal generating circuit generates a reference signal in accordance with the reference level signal. A bridge circuit includes a plurality of semiconductor elements so that the semiconductor elements are turned ON and OFF to supply the load current to the load. A sensing circuit senses the load current, to thereby generate a sense signal in accordance with the load current. A current correction circuit including a correction comparator compares the sense signal with the reference level signal to generate a correction signals so that the reference signal is corrected by the correction signal.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENT

Before the description of the preferred embodiment, prior art PWM current controlling apparatuses will be explained with reference to FIGS. 1, 2, 3 and 4.

Figure 1:
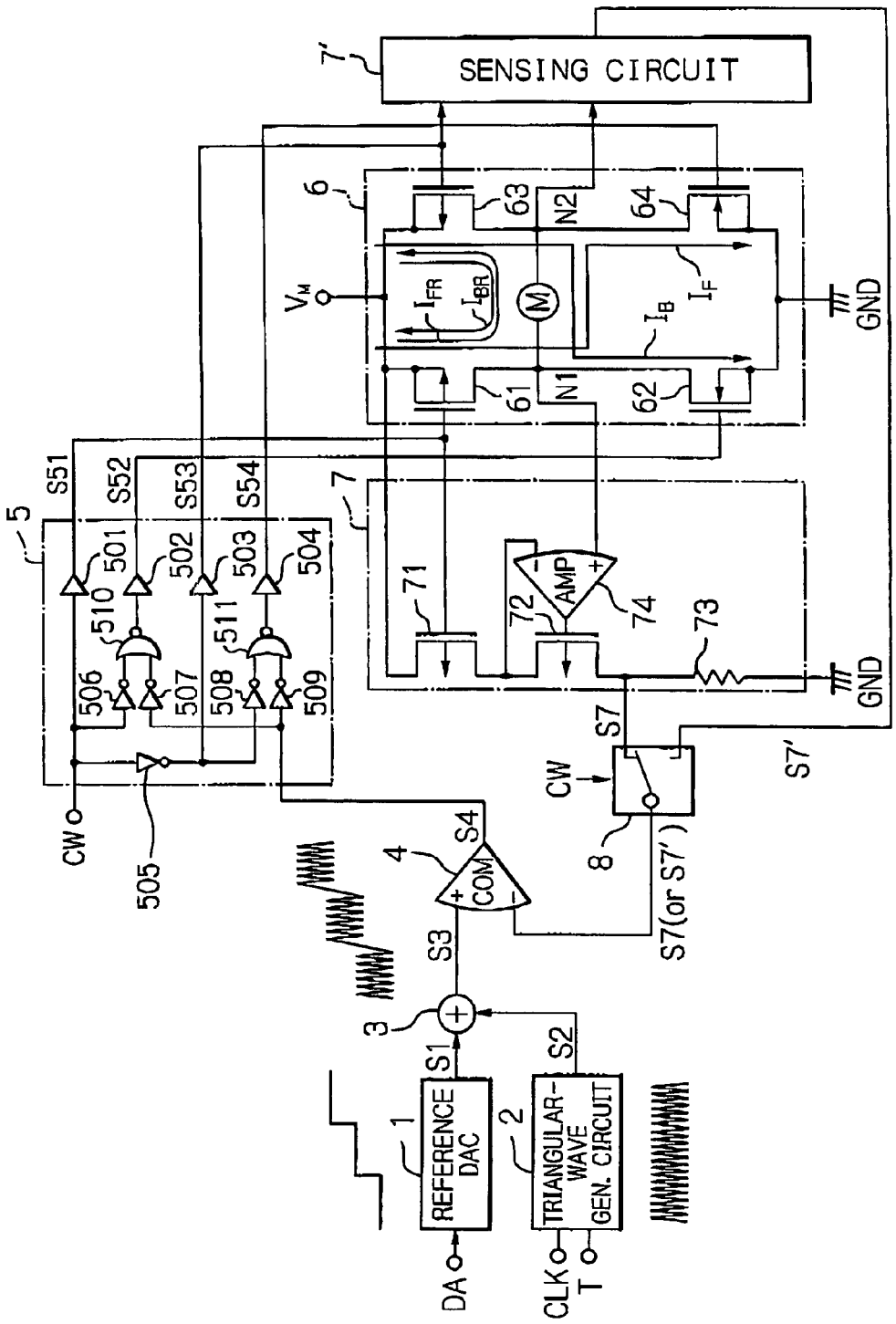
FIG. 1 is a circuit diagram illustrating a first prior art PWM current controlling apparatus.

In FIG. 1, which illustrates a first prior art PWM current controlling apparatus for controlling a load current flowing through a load such as a motor M, a reference digital-to-analog converter 1 serving as a reference level signal generating circuit performs a digital-to-analog conversion upon digital data DA from a control circuit (not shown) to generate a reference level signal S1. Also, a triangular-wave signal generating circuit 2 generates a triangular-wave signal S2 in accordance with a clock signal. CLK and a PWM timing signal T for defining a PWM period. For example, the triangular-wave signal generating circuit 2 includes an up/down counter whose content is counted up or down by receiving the clock signal CLK and whose up and down counting operations are reversed at every half time period of the timing signal T. The triangular-wave signal S2 is added to the reference level signal S1 by an adder 3 serving as a reference signal generating circuit which generates a reference signal S3.

A comparator 4 compares the reference signal S3 from the adder 3 with a sense signal S7 (or S7') to generate a PWM signal S4. The sense signals S7 and S7' will be explained later.

The PWM signal S4 is supplied to a predriver 5 formed by buffers 501, 502, 503 and 504, inverters 505, 506, 507, 508 and 509, and NOR circuits 510 and 511, which buffers generate PWM current controlling signals S51, S52, S53 and S54, respectively, in accordance with a forward/backward signal CW.

In a forward mode (CW="0"),
S51="0" (ON state)
S52="0" (OFF state)
S53="1" (OFF state)
S54=S4 (PWM state)

In this case, when PWM="1", the forward mode is a pure forward mode, and then, when PWM="0", the pure forward mode enters a regenerative mode.

In a backward mode (CW="1"),
S51="1" (OFF state)
S52=S4 (PWM state)
S53="0" (ON state)
S54="0" (OFF state)

In this case, when PWM="1", the backward mode is a pure backward mode, and then, when PWM-"0", the pure backward mode enters a regenerative mode.

The PWM current controlling signals S51, S52, S53 and S54 are supplied to an H bridge circuit 6 for driving the motor M.

The H bridge circuit 6 is connected between a power supply voltage terminal VM and a ground voltage terminal GND.

The H bridge circuit 6 is formed by a p-channel MOS transistor 61 and an n-channel MOS transistor 62 connected in series between the power supply voltage terminal $V_H$ and the ground voltage terminal GND, and a p-channel MOS transistor 63 and an n-channel MOS transistor 64 connected in series between the power supply voltage terminal $V_H$ and the ground voltage terminal GND. The motor M is connected between a node N1 of the drains of the MOS transistors 61 and 62 and a node N2 of the drains of the MOS transistors 63 and 64. The MOS transistors 61, 62, 63 and 64 are turned ON and OFF by the PWM current controlling signals S51, S52, S53 and S54, respectively. For example, in a pure forward mode, the transistors 61 and 64 are turned ON and the transistors 62 and 63 are turned OFF, so that a forward current $I_F$ flows through the motor M. Then, in a regenerative mode after the pure forward mode, the transistor 64 is turned OFF. As a result, a regenerative current $I_{FR}$ flows from the transistor 61 through the motor M, and a parasitic diode (the transistor 63) to the transistor 61. In this case, since the backgate and source of the transistor 63 are short-circuited, the drain-to-backgate of the transistor 63 serves as such a parasitic diode. On the other hand, in a pure backward mode, the transistors 62 and 63 are turned ON and the transistors 61 and 64 are turned OFF, so that a backward current $I_B$ flows through the motor M. Then, in a regenerative mode after the pure backward mode, the transistor 62 is turned OFF. As a result, a regenerative current $I_{BD}$ flows from the transistor 63 through the motor M, and a parasitic diode (the transistor 61) to the transistor 63. In this case, since the backgate and source of the transistor 61 are short-circuited, the drain-to-backgate of the transistor 61 serves as such a parasitic diode.

A sensing circuit 7 senses the load current I flowing through the motor M to generate the sense signal S7. The sensing circuit 7 is formed by a p-channel MOS transistor 71 forming a current mirror circuit with the p-channel MOS transistor 61, a p-channel MOS transistor 72, a sense resistor 73 whose resistance value is several kΩ, and an operational amplifier 74. In this case, the size of the p-channel MOS transistor 71 in relation to that of the p-channel MOS transistor 71 is about 500/1. Also, the operational amplifier 74 controls the gate voltage of the p-channel MOS transistor 72 so that the drain voltage of the p-channel MOS transistor 71 is brought close to the drain voltage of the p-channel MOS transistor 61. As a result, the sense signal S7 is approximately in proportion to the load current flowing through the motor M. For example, if the load current flowing through the motor M is 100 mA, a sense current flowing through the transistor 71 is 200 μA (=100 mA/500), so that the sense signal S7 is a voltage of 200 mV (=200 μA·1 kΩ) where the resistance value of the resistor 73 is 1 kΩ.

Note that another sensing circuit 7' similar to the sensing circuit 7 is provided to sense a sense signal S7' in a backward mode. One of the sense signals S7 and S7' is selected by a selector 8 in accordance with the forward/backward signal CW, and is supplied to the comparator 4. For example, when the forward/backward signal CW is "0" (forward mode), the selector 8 selects the sense signal S7. On the other hand, when the forward/backward signal CW is "1" (backward mode), the selector 8 selects the sense signal S7'.

Figure 2:
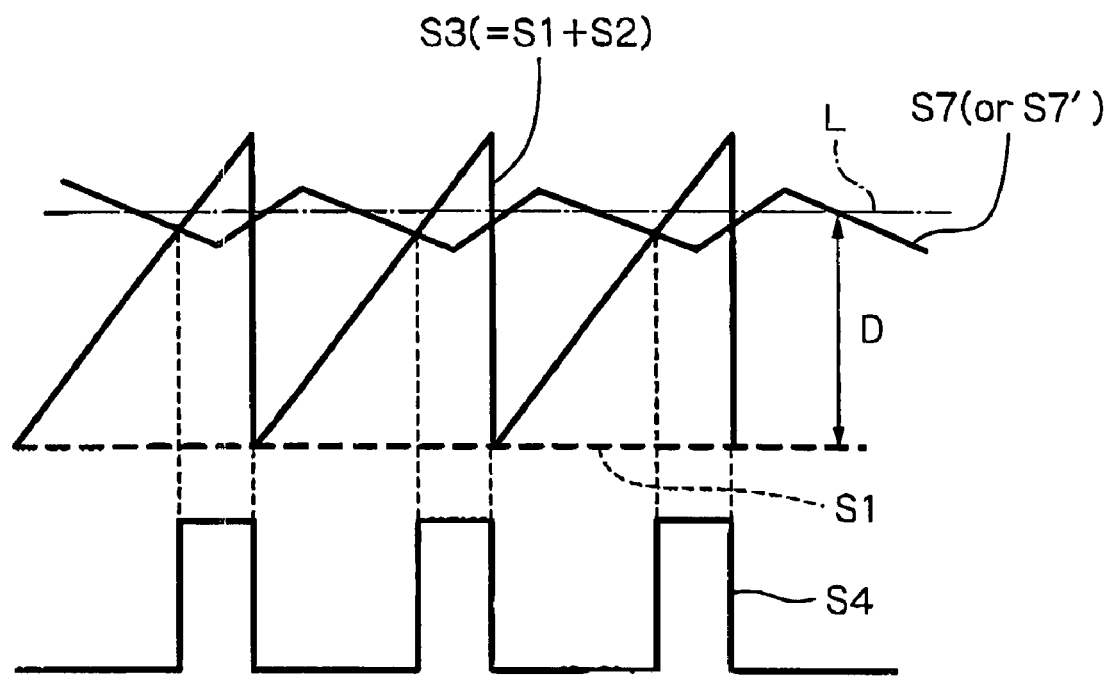
FIG. 2 is a timing diagram for explaining the operation of the PWM current controlling apparatus of FIG. 1.
Figure 3:
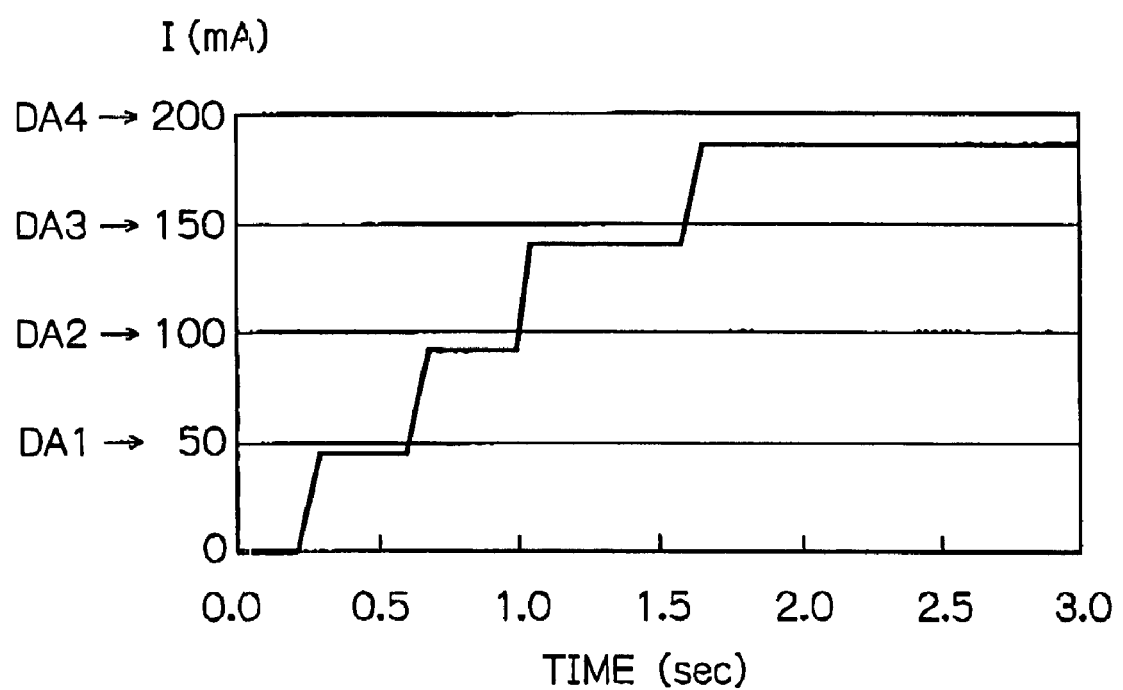
FIG. 3 is a timing diagram of the load current flowing through the motor of FIG. 1.

The operation of the current controlling apparatus of FIG. 1 is explained next with reference to FIG. 2. That is, since the reference signal S3 is an addition of the reference level signal S1 and the triangular-wave signal S2, the reference signal S3 has the same amplitude as that of the triangular-wave signal S2. As a result, the sense signal S7 (or S7') is stable around a level L shifted by a deviation D from the reference level signal S1. This deviation would deviate the load current I flowing through the motor M with reference to the aimed currents 50 mA, 100 mA, 150 mA and 200 mA designated by the digital data DA1, DA2, DA3 and DA4 for every 0.5 sec as shown in FIG. 3 where $V_M$=5V and the motor M has resistance of 20Ω and an inductance of 3 mH. That is, when the aimed current is small, i.e., 50 mA or 100 mA, the load current I is approximately the same as the aimed current. However, when the aimed current is large, i.e., 150 mA or 200 mA, the load current I is greatly deviated from the aimed current.

Figure 4:
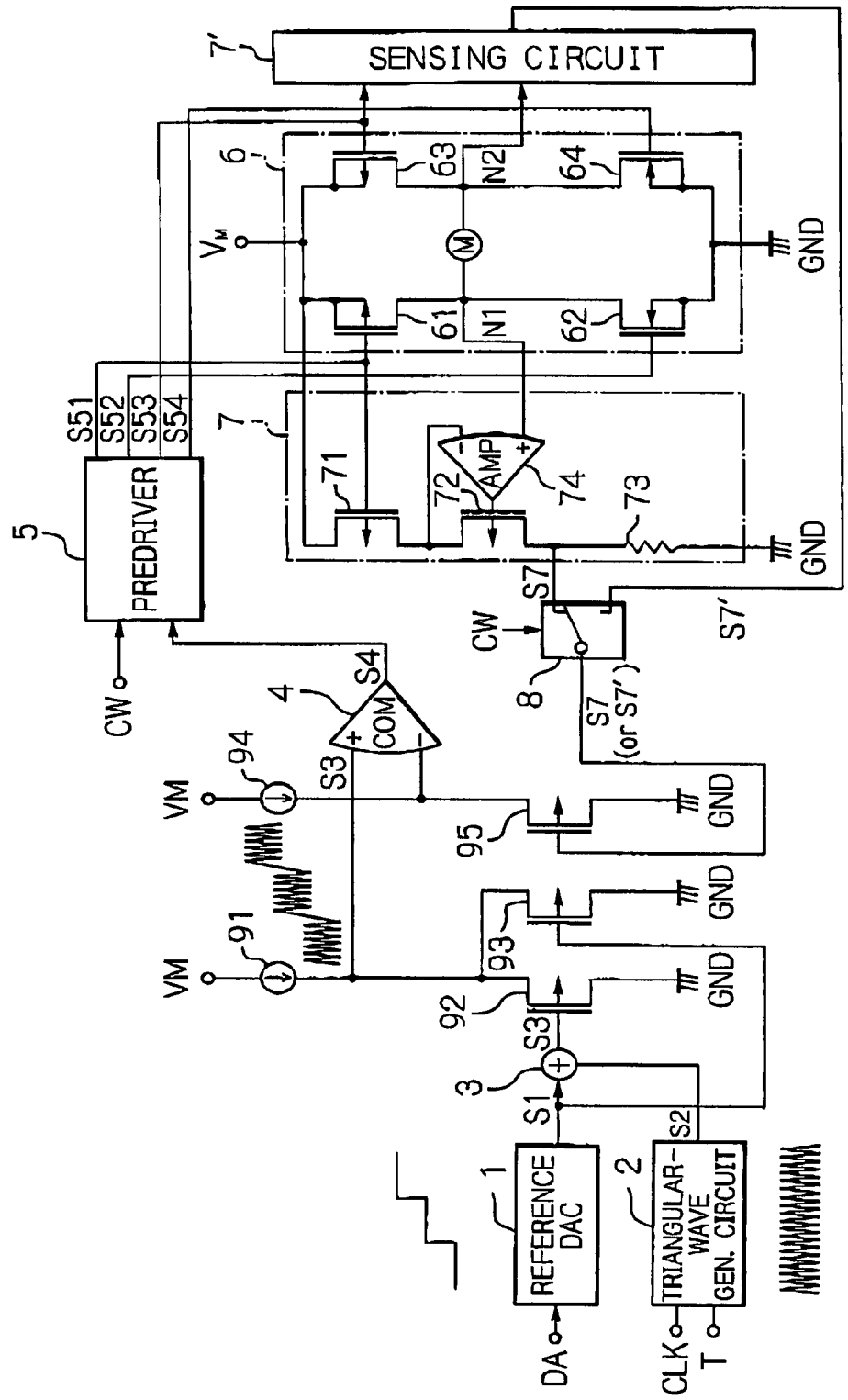
FIG. 4 is a circuit diagram illustrating a second prior art PWM current controlling apparatus.

In FIG. 4, which illustrates a second prior art PWM current controlling apparatus, a constant current source 91, p-channel MOS transistors 92 and 93 connected to the constant current source 91, a constant current source 94, and a p-channel MOS transistor 95 are added to the PWM current controlling apparatus of FIG. 1. That is, the sources of the p-channel MOS transistors 92 and 93 are connected to the (+)-input of the comparator 4, while the source of the p-channel MOS transistor 95 is connected to the (−)-input of the comparator 4. Thus, the reference signal S3 supplied to the (+)-input of the comparator 4 is compensated for by the reference level signal S1, so that the deviation D of the sense signal S7 (or S7) with respect to the reference level signal S1 as shown in FIG. 2 would be suppressed under a special load condition over a small load current range designated by the digital data DA.

In the PWM current controlling apparatus of FIG. 4, however, the above-mentioned deviation D is suppressed only under the special load condition, it is impossible to always suppress the deviation D under all possible currents designated by the digital data DA.

Figure 5:
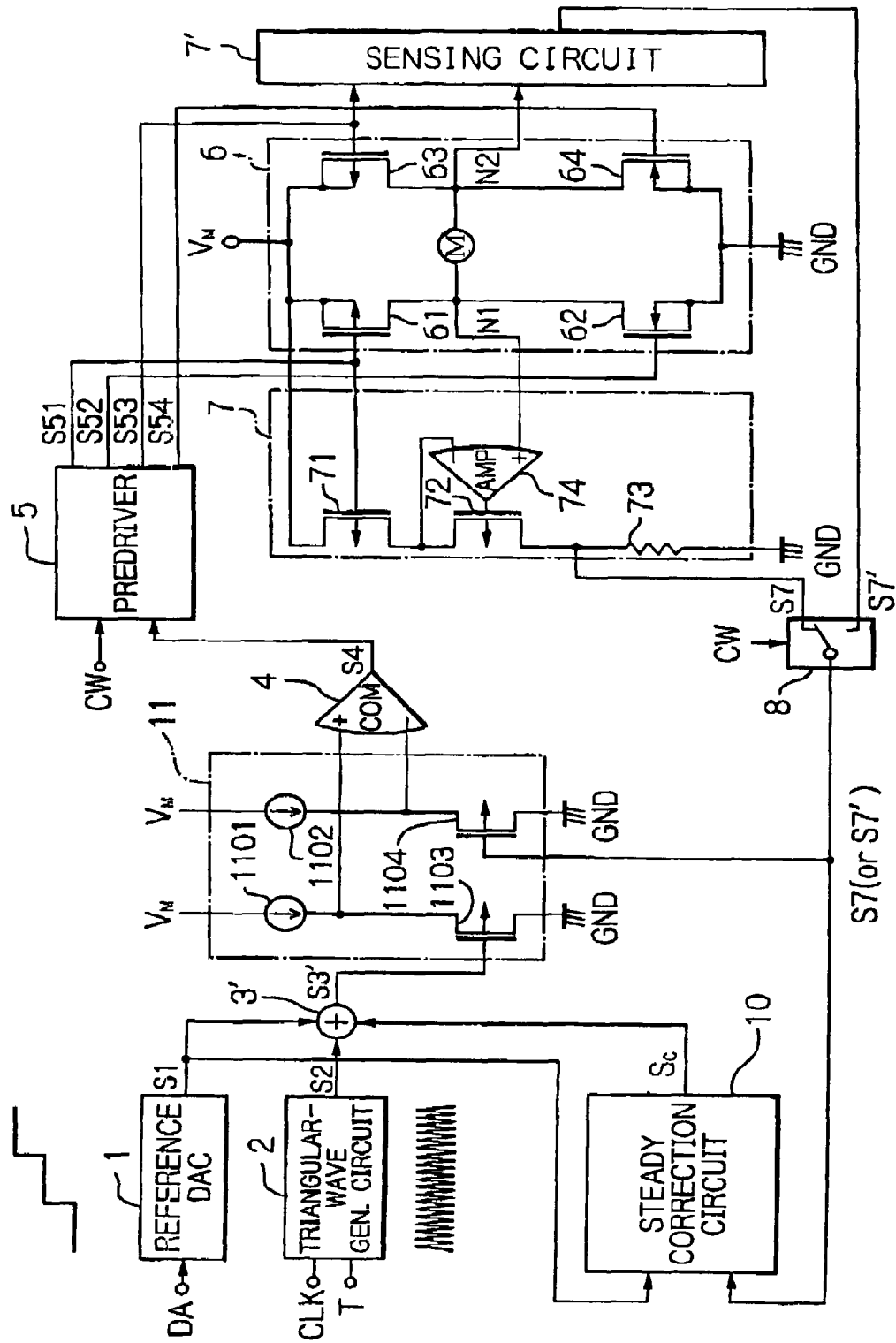
FIG. 5 is a circuit diagram illustrating an embodiment of the PWM current controlling apparatus according to the present invention.

In FIG. 5, which illustrates an embodiment of the PWM current controlling apparatus according to the present invention, a steady correction circuit 10 serving as a current correction circuit is added to the elements of the PWM current controlling apparatus of FIG. 1, and the adder 3 of FIG. 1 is replaced by an adder 3' serving as a reference signal generating circuit.

As occasion demands, a level shift circuit 11 formed by constant current sources 1101 and 1102 and p-channel MOS transistors 1103 and 1104 may be inserted between the adder 3' as well as the selector 8 and the comparator 4.

The steady correction circuit 10 compares the reference level signal S1 from the reference level generating circuit 1 with the sense signal S7 (or S7') to generate a correction signal $S_C$.

The adder 3' performs an addition operation upon the reference level signal S1, the triangular-wave signal S2 and the correction signal S.sub.C to generate a reference signal S3'. Thus, the reference signal S3' is always obtained by correcting the reference signal S3 of FIG. 1 using the difference between the reference level signal S1 and the sense signal S7 (or S7').

Figure 6:
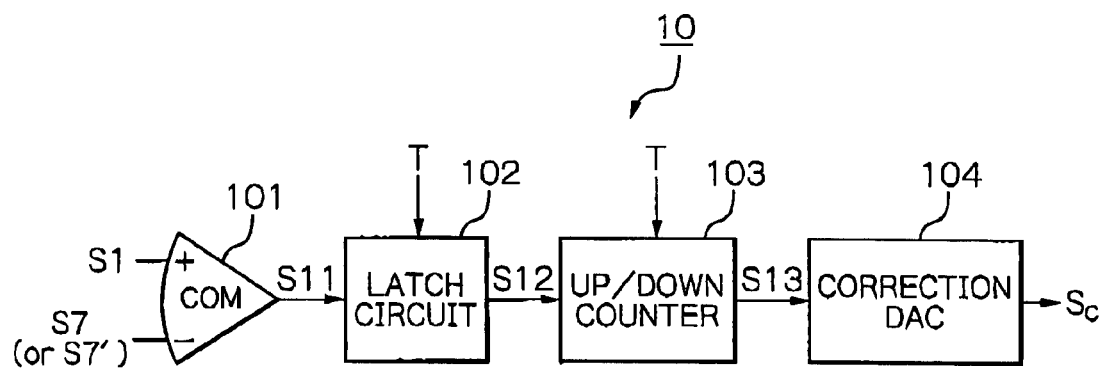
FIG. 6 is a block circuit diagram of the steady correction circuit of FIG. 5.

In FIG. 6, which is a block circuit diagram of the steady correction circuit 10 of FIG. 5, the steady correction circuit 10 is formed by a correction comparator 101 for steadily comparing the reference level signal S1 from the reference level generating circuit 1 with the sense signal S7 (or S7'), a latch circuit 102 for latching the output signal S11 of the correction comparator 101, an up/down counter 103 for counting the timing signal T in accordance with the output signal S12 of the latch circuit 2, and a correction digital-to-analog converter 104 serving as a correction current generating circuit for performing a digital-to-analog conversion upon the output signal S13 of the up/down counter 103 to generate the correction signal $S_C$.

When the reference level signal S1 is higher than the sense signal S7 (or S7'), the output signal S11 of the correction comparator 101 is high. On the other hand, when the reference level signal S1 is not higher than the sense signal S7 (or S7'), the output signal S11 of the correction comparator 101 is low.

When the output signal S11 of the correction comparator 101 falls while the output signal S12 of the latch circuit 102 is high, the output signal S12 falls at the next timing signal T. On the other hand, when the output signal S11 of the correction comparator 101 rises while the output signal S12 of the latch circuit 102 is low, the output signal S12 rises at the next timing signal T.

Thus, the latch circuit 101 wave-shapes the output signal S11 of the correction comparator 101.

When the output signal S12 of the latch circuit 102 is high, the up/down counter 103 serves as an up counter whose output signal S13 is incremented by receiving the timing signal T. On the other hand, when the output signal S12 of the latch circuit 102 is low, the up/down counter 103 serves as a down counter whose output signal S13 is decremented by receiving the timing signal T.

The latch circuit 102 of FIG. 6 is explained next with reference to FIG. 7.

The latch circuit 102 is formed by an RS flip-flop 1021 for latching the output signal S11 of the correction comparator 101 and a D flip-flop 1022 for synchronizing the output signal of the RS flip-flop 1021 with the timing signal T. Also, an inverter 1023 and a NAND circuit 1024 are provided so that the RS flip-flop 1021 is reset by a falling timing of the output signal S11 of the correction comparator 101 while the output signal S12 of the latch circuit 102 or the D flip-flop 1022 is high. On the other hand, an inverter 1025 and a NAND circuit 1026 are provided so that the RS flip-flop 1021 is set by a rising timing of the output signal S11 of the correction comparator 101 while the output signal S12 of the latch circuit 102 or the D flip-flop 1022 is low.

Figure 7:
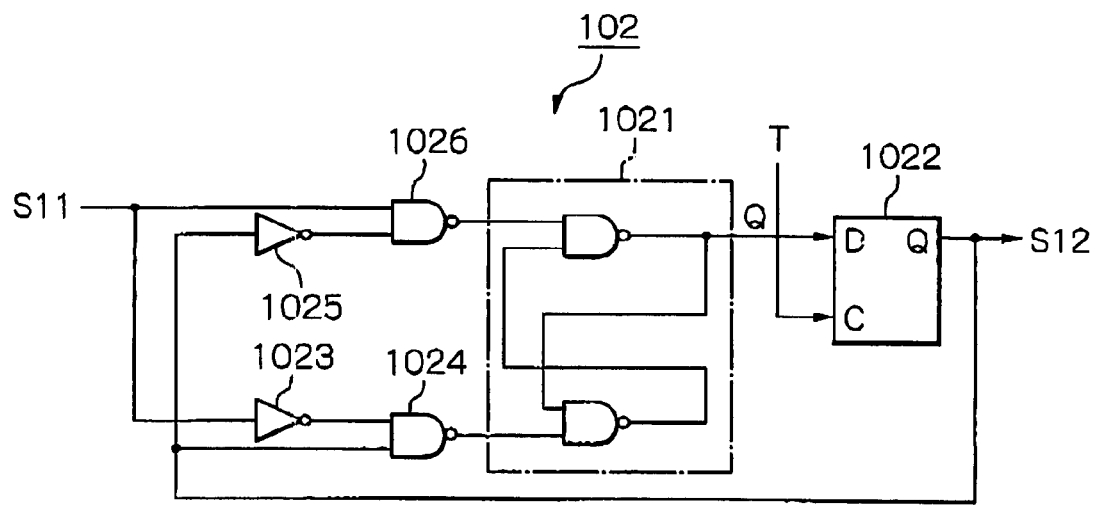
FIG. 7 is a detailed circuit diagram of the latch circuit of FIG. 6.

The operation of the steady correction circuit 10 of FIG. 6 including the latch circuit 102 of FIG. 7 is explained next with reference to FIG. 8.

During a time period from time t0 to time t2, the sense signal S7 (or S7') is lower than the reference level signal S1, so that the output signal S11 of the correction comparator 101 is high. Therefore, since the output signal S11 of the correction comparator 101 is not reversed, the output signal Q of the RS flip-flop 1021 of the latch circuit 102, i.e., the output signal S12 of the latch circuit 102 is unchanged. In this case, since the output signal S12 of the latch circuit 102 is high, the up/down counter 103 serves as an up counter whose output signal S13 is incremented by every pulse of the timing signal T, so that the correction signal $S_C$ of the correction digital-to-analog converter 104 is increased.

During a time period from time t2 to time t3, the sense signal S7 (or S7') becomes higher than the reference level signal S1 for some time, so that the output signal S11 of the correction comparator 101 is switched from high to low. Therefore, since the output signal S12 of the latch circuit 102 is high, the output signal Q of the RS flip-flop 1021 is switched from high to low, so that the output signal S12 of the latch circuit 102 is switched from high to low at the next timing signal T (=t3). Thus, the up/down counter 103 serves as a down counter whose output signal S13 is decremented at time t3, so that the correction signal $S_C$ of the correction digital-to-analog converter 104 is decreased. Note that the switching of the output signal S11 of the correction comparator 101 from low to high does not affect the operation of the RS flip-flop 1021, i.e., the latch circuit 102, due to the high level of the output signal S12 thereof.

During a time period from time t3 to time t4, the sense signal S7 (or S7') becomes lower than the reference level signal S1 for some time, so that the output signal S11 of the correction comparator 101 is switched from low to high. Therefore, since the output signal S12 of the latch circuit 102 is low, the output signal Q of the RS flip-flop 1021 is switched from low to high, so that the output signal S12 of the latch circuit 102 is switched from low to high at the next timing signal T (=t4). Thus, the up/down counter 103 serves as an up counter whose output signal S13 is incremented at time t4, so that the correction signal $S_C$ of the correction digital-to-analog converter 104 is increased. Note that the switching of the output signal S11 of the correction comparator 101 from high to low does not affect the operation of the RS flip-flop 1021, i.e., the latch circuit 102, due to the low level of the output signal S12 thereof.

During a time period from time t4 to time t5 in the same way as in the time period from time t2 to time t3, the sense signal S7 (or S7') becomes higher than the reference level signal S1 for some time, so that the output signal S11 of the correction comparator 101 is switched from high to low. Therefore, since the output signal S12 of the latch circuit 102 is high, the output signal Q of the RS flip-flop 1021 is switched from high to low, so that the output signal S12 of the latch circuit 102 is switched from high to low at the next timing signal T (=t5). Thus, the up/down counter 103 serves as a down counter whose output signal S13 is decremented at time t5, so that the correction signal $S_C$ of the correction digital-to-analog converter 104 is decreased. Note that the switching of the output signal S11 of the correction comparator 101 from low to high does not affect the operation of the RS flip-flop 1021, i.e., the latch circuit 102, due to the high level of the output signal S12 thereof.

During a time period from time t5 to time t6, the sense signal S7 (or S7') crosses the reference level signal S1, so that the output signal S11 of the correction comparator 101 is switched from high to low. However, this switching of the output signal S11 of the correction comparator 101 from high to low does not affect the operation of the RS flip-flop 1021, i.e., the latch circuit 102, due to the low level of the output signal S12 thereof.

During a time period from time t6 to time t7, the sense signal S7 (or S7') crosses the reference level signal S1, so that the output signal S11 of the correction comparator 101 is switched from low to high. Therefore, since the output signal S12 of the latch circuit 102 is low, the output signal Q of the RS flip-flop 1021 is switched from low to high, so that the output signal S12 of the latch circuit 102 is switched from low to high at the next timing signal T (=t7). Thus, the up/down counter 103 serves as an up counter whose output signal S13 is incremented at time t7, so that the correction signal $S_C$ of the correction digital-to-analog converter 104 is increased.

During a time period from time t7 to time t8 and during a time period from time t9 to time t10 in the same way as in the time period from time t2 to time t3, the sense signal S7 (or S7') becomes higher than the reference level signal S1 for some time, so that the output signal S11 of the correction comparator 101 is switched from high to low. Therefore, since the output signal S12 of the latch circuit 102 is high, the output signal Q of the RS flip-flop 1021 is switched from high to low, so that the output signal S12 of the latch circuit 102 is switched from high to low at the next timing signal T (=t8 or t10). Thus, the up/down counter 103 serves as a down counter whose output signal S13 is decremented at time t8 or t10, so that the correction signal Sc of the correction digital-to-analog converter 104 is decreased. Also, note that the switching of the output signal S11 of the correction comparator 101 from low to high does not affect the operation of the RS flip-flop 1021, i.e., the latch circuit 102, due to the high level of the output signal S12 thereof.

During a time period from time t8 to time t9 and during a time period from time t10 to time t11 in the same way as in the time period from time t3 to time t4, the sense signal S7 (or S7') becomes lower than the reference level signal S1 for some time, so that the output signal S11 of the correction comparator 101 is switched from low to high. Therefore, since the output signal S12 of the latch circuit 102 is low, the output signal Q of the RS flip-flop 1021 is switched from low to high, so that the output signal S12 of the latch circuit 102 is switched from low to high at the next timing signal T (=t9 or t11). Thus, the up/down counter 103 serves as an up counter whose output signal S13 is incremented at time t9 or t11, so that the correction signal $S_C$ of the correction digital-to-analog converter 104 is increased. Also, note that the switching of the output signal S11 of the correction comparator 101 from high to low does not affect the operation of the RS flip-flop 1021, i.e., the latch circuit 102, due to the low level of the output signal S12 thereof.

The correction signal $S_C$ of the correction digital-to-analog converter 104 is changed in accordance with the count value, i.e., the output signal S13 of the up/down counter 103, and is supplied to the adder 3', to thereby correct the reference signal S3'. For example, when the correction signal $S_C$ of the correction digital-to-analog converter 104 is increased, the reference signal S3' is increased to increase the pulse width of the PWM signal S4 which increases the load current I flowing through the motor M. On the other hand, when the correction signal $S_C$ of the correction digital-to-analog converter 104 is decreased, the reference signal S3' is decreased to decrease the pulse width of the PWM signal S4 which decreases the load current I flowing through the motor M.

Figure 8:
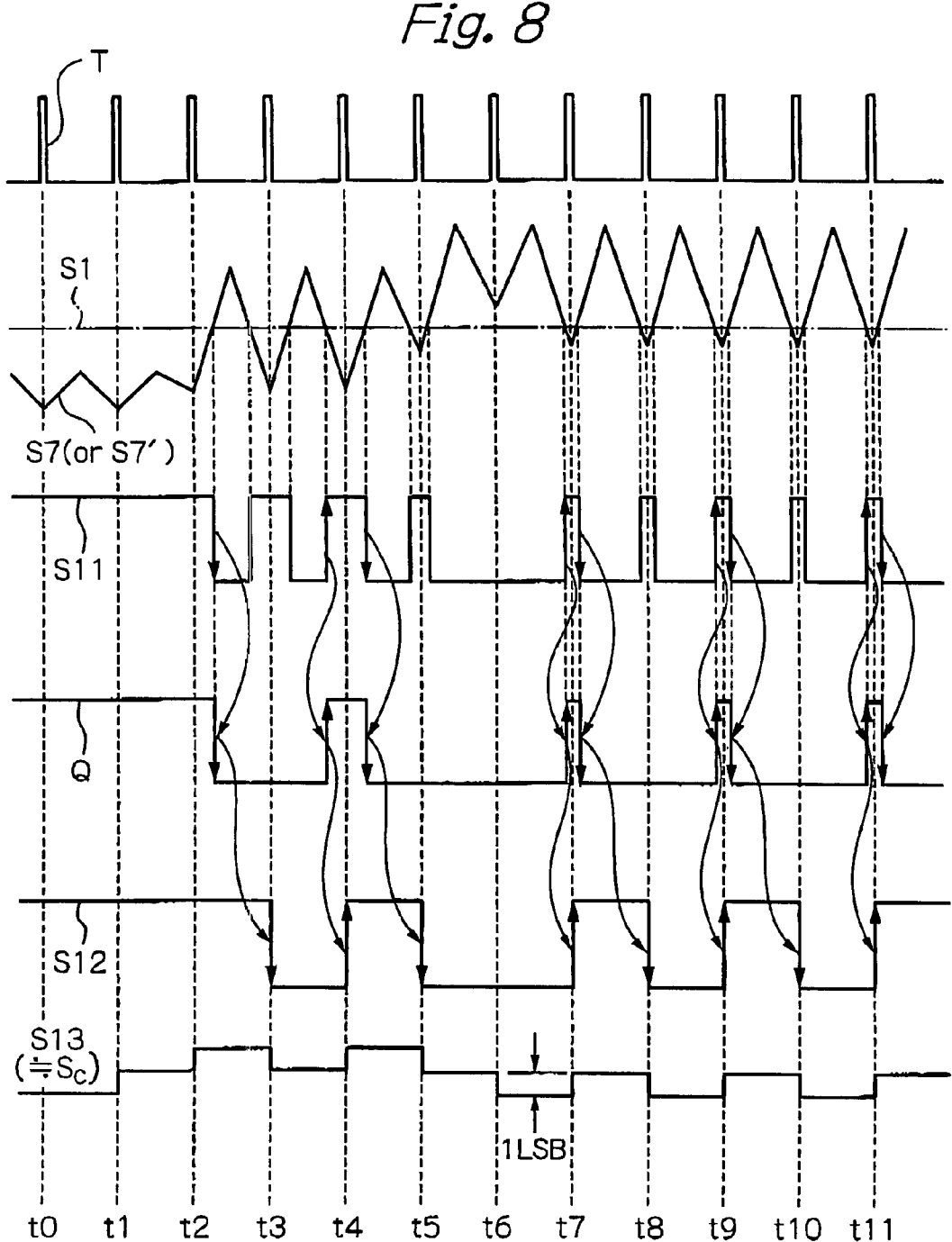
FIG. 8 is a timing diagram for explaining the operation of the steady correction circuit of FIG. 6 including the latch circuit of FIG. 7.

As illustrated in FIG. 8, after time t7, when the voltage of the sense signal S7 (or S7') is approximately the same as that of the reference level signal S1, the output signal S11 of the correction comparator 101 alternates high voltages with low voltages for every period of the timing signal T. That is, the up/down counter 103 alternates counting-up operations with counting-down operations for every period of the timing signal T, so that the correction signal $S_C$ of the correction digital-to-analog converter 104 is within a range of a least significant bit (LSB). Thus, the reference signal S3' is definite, and the sense signal S7 (or S7') is about the same as reference level signal S1. As a result, the load current I flowing through the motor M is definite.

Figure 9:
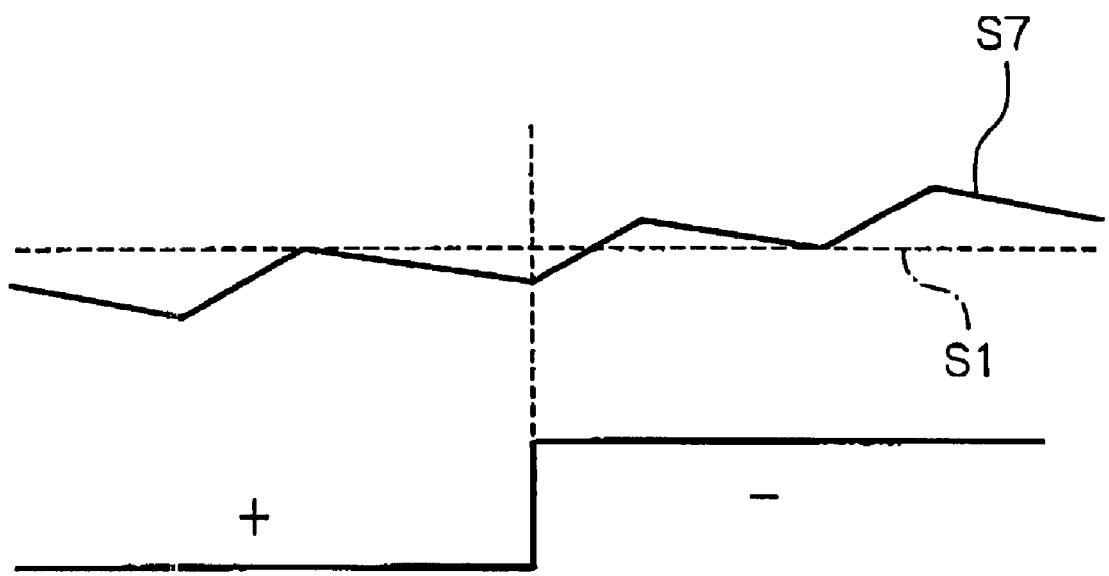
FIG. 9 is a timing diagram for explaining the correction of the reference signal of FIG. 6.
Figure 10:
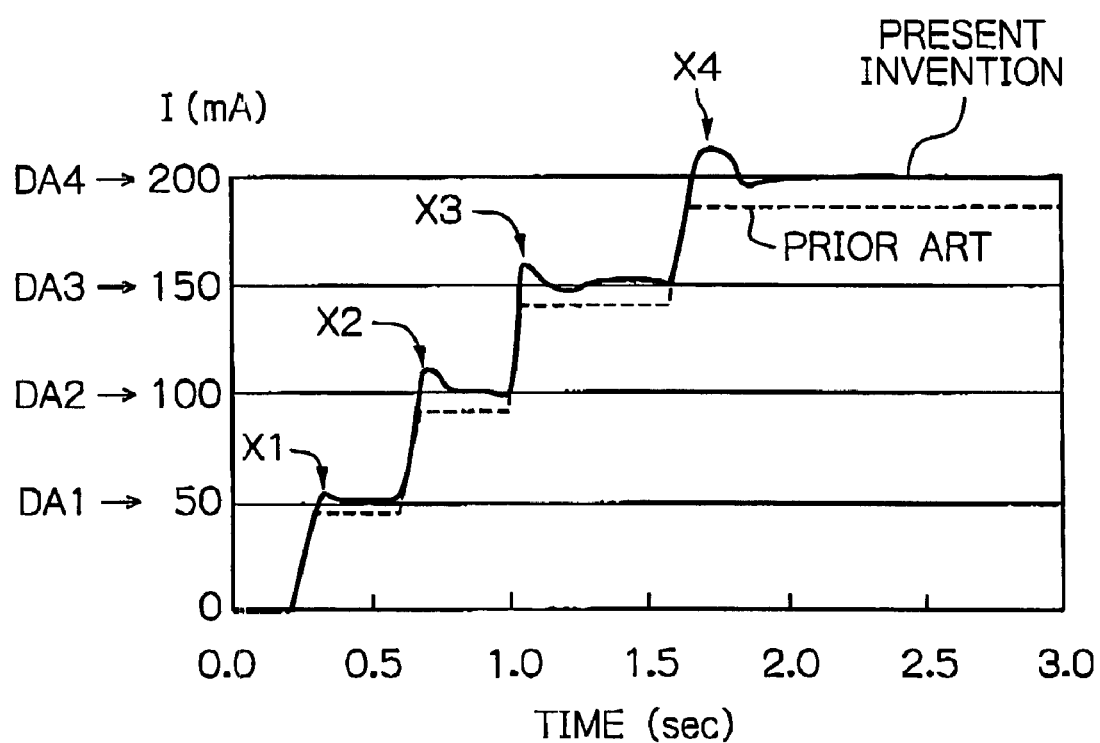
FIG. 10 is a timing diagram of the load current flowing through the motor of FIG. 5.

Therefore, as shown in FIG. 9, when the voltage of the sense signal S7 (or S7') is lower than that of the reference level signal S1, the steady correction circuit 10 shifts the reference signal S3' to the positive (+) side. On the other hand, when the voltage of the sense signal S7 (or S7') is higher than that of the reference level signal S1, the steady correction circuit 10 shifts the reference signal S3' to the negative (−) side. As a result, the sense signal S7 (or S7') is stable around the reference level signal S1. This would not deviate the load current I flowing through the motor M with reference to the aimed currents 50 mA, 100 mA, 150 mA and 200 mA designated by the digital data DA1, DA2, DA3 and DA4 for every 0.5 sec in a first simulation result as shown in FIG. 10 where $V_M$=5V and the motor M has a resistance of 20Ω and an inductance of 3 mH. That is, even when the aimed current is large, i.e., 150 mA or 200 mA, the load current I is approximately the same as the aimed current. Note that, since the steady correction circuit 10 is steadily operated, a ringing phenomenon may be generated in a transcient state as indicated by X1, X2, X3 or X4 in FIG. 10 which shows a first simulation result, such a ringing phenomenon would disappear over time. Thus, no problem would occur.

Figure 11A:
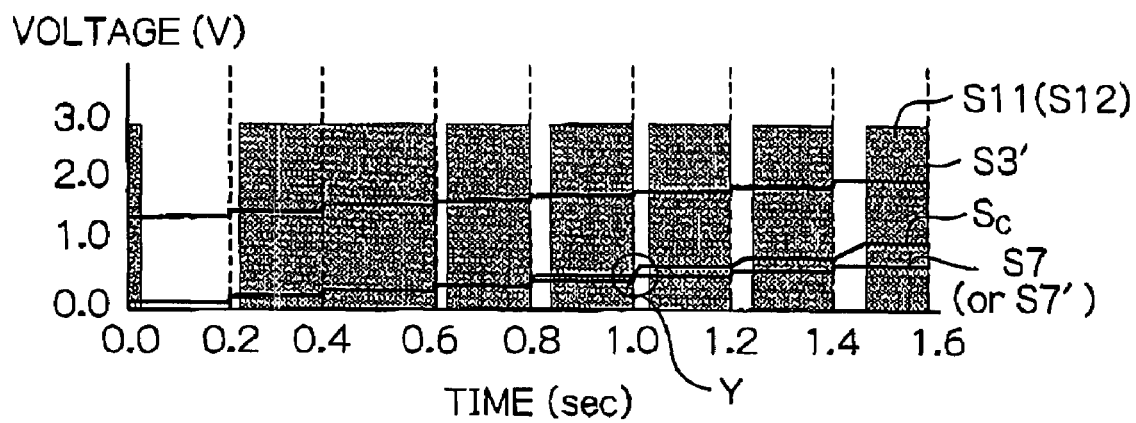
FIGS. 11A and 11B are timing diagrams for explaining the operation of the PWM current controlling apparatus of FIG. 5.
Figure 11B:
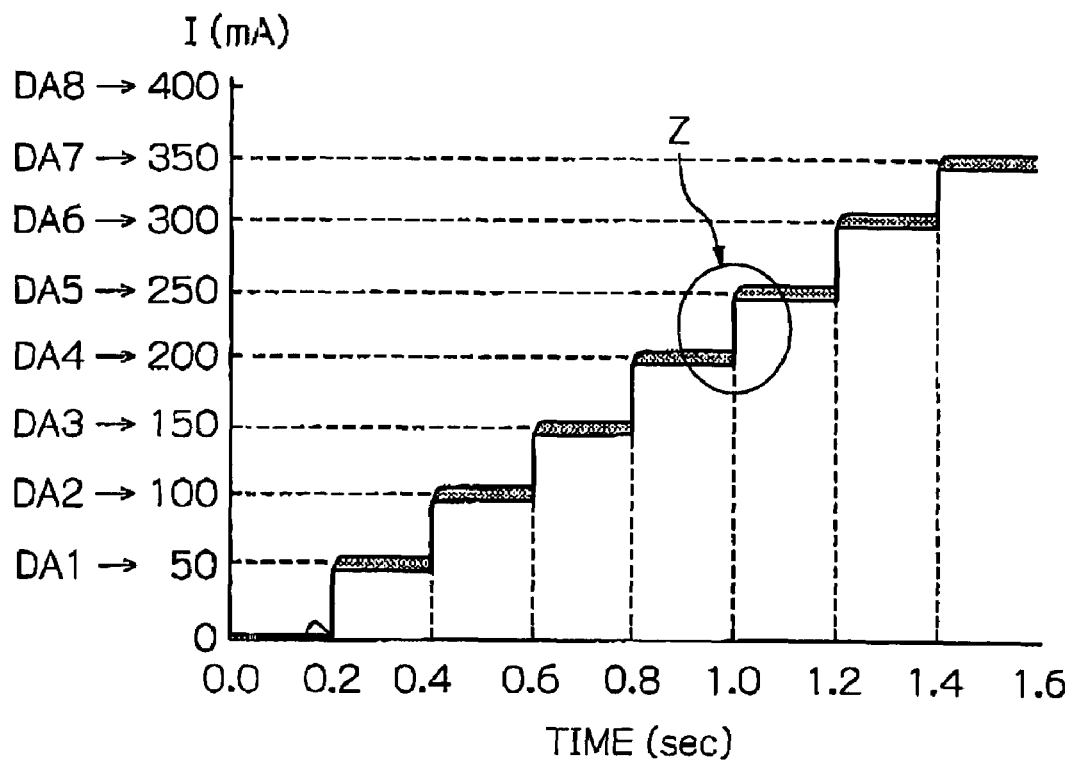
Figure 12A:
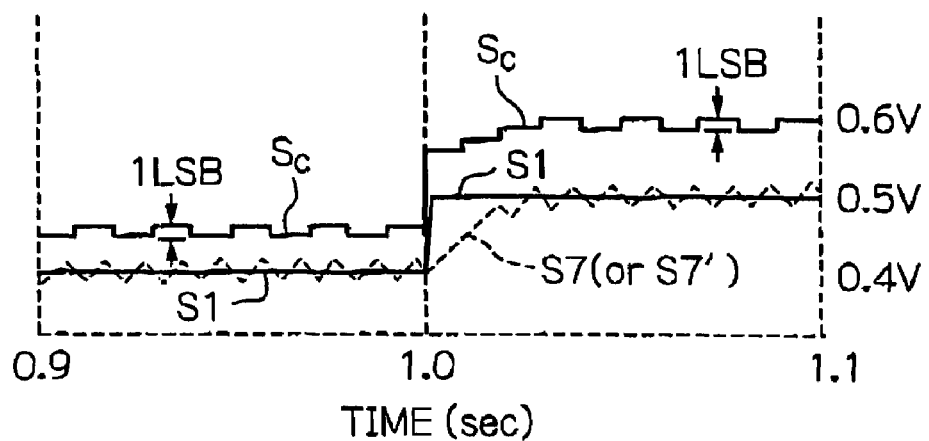
FIGS. 12A and 12B are partially enlarged diagrams of FIGS. 11A and 11B, respectively.
Figure 12B:
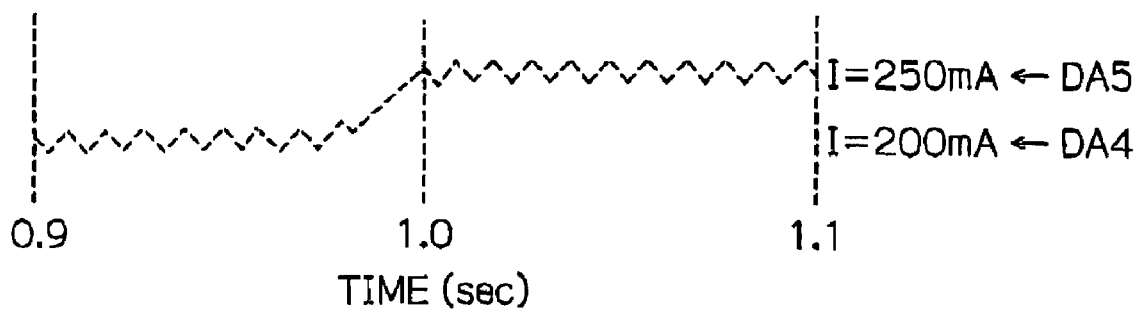

A second simulation result is shown in FIGS. 11A and 11B and FIGS. 12A and 12B which are partially-enlarged figures of portions Y and Z of FIGS. 11A and 11B, respectively. This second simulation result is obtained under the condition that aimed currents 50 mA, 100 mA, . . . are designated by digital data DA1, DA2, . . . for every 0.2 sec where $V_M$=5V and the motor M has a resistance of 10 and an inductance of 1 mH. According to the second simulation result, the load current I is approximately the same as each of the aimed currents. As shown in FIGS. 12A and 12B, when the aimed current is changed from 200 mA designated by digital data DA4 to 250 mA designated by digital data DA5, if the sense signal S7 (or S7') is approximately the same as the reference level signal S1, the output signal S11 of the correction comparator 101 alternates high voltages and low voltages, so that the up/down counter 103 alternates counting-up operations and counting-down operations. Thus, the change of the correction signal Sc of the correction digital-to-analog converter 104 is 1 LSB. Thus, the reference level signal S3' is definite, so that the duty ratio of the PWM signal S4 is definite. Therefore, the pre-driver 5 drives the H bridge circuit 6 so that the load current I flowing through the motor M is definite. In other words, the voltage of the sense signal S7 (or S7') is approximately the same as that of the reference level signal S1.

The above-mentioned ripple phenomenon occurring at the load current flowing through the motor M is due to the fact that the motor M has an inductance. That is, as shown in FIGS. 12A and 12B, when the voltage of the reference level signal S1 is increased from 0.4V to 0.5V in order to increase the load current I from 200 mA to 250 mA, the up/down counter 103 serves as an up counter since the voltage of the sense signal S7 (or S7') is lower than that of the reference level signal S1. Therefore, the voltage of the correction signal $S_C$ of the correction digital-to-analog converter 104 is increased. As a result, the voltage of the reference level signal S3' is increased to increase the pulse width of the PWM signal S4, i.e., the load current I flowing through the motor M. Finally, when the voltage of the sense signal S7 (or S7') reaches that of the reference level signal S1, the correction signal $S_C$ becomes stable. In other words, the steady correction circuit 10 always compares the voltage of the sense signal S7 (or S7' with that of the reference level signal S1 to correct the reference level signal S3', so that the voltage of the sense signal S7 (or S7') is brought close to that of the reference level signal S1.

As explained hereinabove, according to the present invention, the load current can be an aimed current by optimally controlling the PWM signal, under any load condition over a wide load current range.

The invention claimed is:

1. A current controlling apparatus for controlling a load current flowing through a load comprising:
   a reference level generating circuit adapted to generate a reference level signal;
   a bridge circuit including a plurality of semiconductor elements, said semiconductor elements being turned ON and OFF to supply said load current to said load;
   a sensing circuit adapted to sense said load current, to thereby generate a sense signal in accordance with said load current;
   a current correction circuit including a correction comparator adapted to compare said sense signal with said reference level signal to generate a correction signal;
   a reference signal generating circuit adapted to add the reference level signal, the correction signal and a triangular-wave signal to provide the reference signal; and
   a comparator adapted to compare the reference signal with the sense signal to generate a pulse width modulation signal for controlling the bridge circuit to drive the load.

2. The current controlling apparatus as set forth in claim 1, wherein said current correction circuit comprises:
   an up/down counter adapted to carry out a counting-up operation and a counting-down operation in accordance with an output signal of said correction comparator; and
   a correction signal generating circuit adapted to generate said correction signal in accordance with a content of said up/down counter.

3. The current controlling apparatus as set forth in claim 2, wherein said current correction circuit further comprises a latch circuit adapted to latch the output signal of said correction comparator in synchronization with a pulse width modulation timing signal.

4. The current controlling apparatus as set forth in claim 1, further comprising:
   a triangular-wave signal generating circuit adapted to generate a triangular-wave signal;
   a pulse width modulation comparator adapted to compare said sense signal with said reference signal to generate a pulse width modulation signal; and
   a predriver adapted to generate a plurality of signals for controlling said semiconductor elements in accordance with said pulse width modulation signal, said reference signal generating circuit adapted to add said triangular-wave signal to said reference level signal, to thereby generate said reference signal.

5. The current controlling apparatus as set forth in claim 1, wherein said sensing circuit comprises MOS transistors.

6. The current controlling apparatus as set forth in claim 1, wherein said bridge circuit supplies said load current to a motor, to thereby drive said motor.

7. The current controlling apparatus as set forth in claim 1, wherein said bridge circuit comprises an H bridge circuit.

8. A pulse width modulation current controlling apparatus for controlling a load current flowing through a load, comprising:
   a reference digital-to-analog converter adapted to performing a digital-to-analog conversion upon digital data to generate a reference level signal;
   a triangular-wave signal generating circuit adapted to generate a triangular-wave signal in accordance with a pulse width modulation timing signal;
   a sensing circuit adapted to sense said load current to generate a sense signal in accordance with said load current;
   a steady correction circuit including a correction comparator adapted to compare said sense signal with said reference level signal, to thereby generate a correction signal;
   an adder adapted to add said triangular-wave signal and said correction signal to said reference level signal, to thereby generate a reference signal;
   a comparator adapted to compare said sense signal with said reference signal, to thereby generate a PWM signal;
   a predriver adapted to generate a plurality of PWM current controlling signals in accordance with said PWM signal; and
   a bridge circuit including semiconductor elements connected to said load, said semiconductor elements driven by said PWM current controlling signals.

9. The pulse width modulation current controlling apparatus as set forth in claim 8, wherein said steady correction circuit further comprises:
   a latch circuit adapted to latch an output signal of said correction comparator in synchronization with said pulse width modulation timing signal;
   an up/down counter adapted to perform a counting-up operation and a counting-down operation upon said pulse width modulation timing signal in accordance with an output signal of said latch circuit; and
   a correction digital-to-analog converter adapted to perform a digital-to-analog conversion upon an output signal of said up/down counter to generate said correction signal.

10. The pulse width modulation current controlling apparatus as set forth in claim 9, wherein said latch circuit comprises:
   an RS flip-flop which is set by a first level of the output signal of said correction comparator while the output signal of said latch circuit has a second level, and is set by the second level of the output signal of said correction comparator while the output signal of said latch circuit has the first level; and
   a D flip-flop adapted to store an output signal of said RS flip-flop in synchronization with said pulse width modulation timing signal to generate said correction signal.

11. The pulse width modulation current controlling apparatus of claim 8, further comprising a level shift circuit formed between the adder and the comparator.

12. The pulse width modulation current controlling apparatus of claim 8, wherein the adder performs an addition operation upon the reference level signal, the triangular wave signal and the correction signal to generate the reference signal.

13. The pulse width modulation current controlling apparatus of claim 8, wherein when the sense signal is lower than the reference signal, the steady correction circuit forms the correction signal to have a positive value.

14. The pulse width modulation current controlling apparatus of claim 8, wherein when the sense signal is higher than the reference signal, the steady correction circuit forms the correction signal to have a negative value.

15. The current controlling apparatus of claim 3, wherein when the reference level signal is higher than the sense signal, the output signal of the correction comparator is high, and
   wherein when the reference level signal is not higher than the sense signal, the output signal is low.

16. The current controlling apparatus of claim 15, wherein when the output signal falls while the latch circuit is high, the output signal rises at a next timing signal, and
   wherein when the output signal rises while the latch circuit is low, the output signal rises at the next timing signal.

* * * * *